US010639773B2

(12) United States Patent
Gibson et al.

(10) Patent No.: US 10,639,773 B2
(45) Date of Patent: May 5, 2020

(54) GARBAGE DISPOSAL INSTALLATION TOOL

(71) Applicant: Fundi, LLC, Springfield, MO (US)

(72) Inventors: James Edward Gibson, Springfield, MO (US); Davis James Gibson, Springfield, MO (US); Stuart S. Coutchie, Ash Grove, MO (US)

(73) Assignee: Fundi, LLC, Springfield, MO (US)

( * ) Notice: Subject to any disclaimer, the term of this patent is extended or adjusted under 35 U.S.C. 154(b) by 100 days.

(21) Appl. No.: 16/050,495

(22) Filed: Jul. 31, 2018

(65) Prior Publication Data

US 2020/0039042 A1 Feb. 6, 2020

(51) Int. Cl.

*B23P 11/00* (2006.01)
*B25B 27/16* (2006.01)
*B25B 27/30* (2006.01)
*E03C 1/266* (2006.01)

(52) U.S. Cl.

CPC ............ *B25B 27/16* (2013.01); *B25B 27/306* (2013.01); *E03C 1/2665* (2013.01)

(58) Field of Classification Search

CPC ......... B25B 27/00; B25B 27/16; B23P 19/00; B23P 19/04; B23Q 1/36

See application file for complete search history.

(56) References Cited

U.S. PATENT DOCUMENTS 3,268,994 A 8/1966 Riley
3,480,241 A 11/1969 Moyer
4,175,734 A * 11/1979 Williams ........... B23K 37/0408 269/49
4,392,641 A * 7/1983 Dearman ........... B23K 37/0408 269/49
4,411,054 A * 10/1983 Zeilenga ............... B25B 27/023 269/49
5,177,853 A * 1/1993 Herook ................... B25B 27/14 29/266
5,573,229 A * 11/1996 Lycan ................ B23K 37/0533 269/49

(Continued)

FOREIGN PATENT DOCUMENTS

CN 204938736 U 1/2016

OTHER PUBLICATIONS

International Search Report and Written Opinion, PCT/US2019/043911, dated Oct. 15, 2019, 9 pages.

*Primary Examiner* — Lee D Wilson
(74) *Attorney, Agent, or Firm* — Stinson LLP

(57) ABSTRACT

A garbage disposal installation tool can support a garbage disposal at an installation position beneath a sink drain. The tool includes a hook configured to hang the garbage disposal from the hook and a suspender configured to suspend the hook beneath a connection point with the sink. The suspender can have an elastic segment that is extended during use to impart a biasing force that urges the garbage disposal toward a bottom portion of the sink. The suspender can also be a flexible suspension line that includes a plurality of connectors at spaced apart locations for connecting the suspender to the sink at respective locations. The tool can include a brace configured to rest on the sink over the drain opening. The brace can include a slot that defines the connection point and is arranged to be in communication with the drain opening when the brace rests on the sink.

25 Claims, 7 Drawing Sheets

(56) References Cited

U.S. PATENT DOCUMENTS

| | | | | | |
|---|---|---|---|---|---|
| 5,685,209 | A * | 11/1997 | Fiedler | B02C 18/16 81/176.1 |
| D396,616 | S * | 8/1998 | McCallum | D8/22 |
| 6,557,229 | B1 | 5/2003 | Ricci | |
| 7,185,408 | B1 | 3/2007 | Keith | |
| 7,458,141 | B2 | 12/2008 | Goldburt et al. | |
| 7,685,689 | B1 | 3/2010 | Del Castello | |
| 7,726,631 | B2 | 6/2010 | Noe et al. | |
| 8,490,277 | B1 | 7/2013 | Dahood | |
| 8,826,505 | B2 * | 9/2014 | Dines | E03C 1/266 29/244 |
| 8,826,605 | B2 | 9/2014 | Recker et al. | |
| 8,931,153 | B1 | 1/2015 | Kimminau | |
| 9,550,279 | B2 * | 1/2017 | Dionne | B25B 9/00 |
| 9,695,021 | B1 | 7/2017 | Stavinga | |
| 9,827,657 | B1 | 11/2017 | Nelson | |
| 2016/0016299 | A1 | 1/2016 | Ekeberg et al. | |

* cited by examiner

GARBAGE DISPOSAL INSTALLATION TOOL

FIELD

This disclosure generally relates to a garbage disposal installation tool for holding a garbage disposal at an installation position below a sink.

BACKGROUND

A garbage disposal is typically installed under a sink, between the sink drain and the sink trap. A garbage disposal has an upper opening that receives the fluid and food waste that runs through the sink drain. A mounting ring can be used to fasten the garbage disposal to the sink such that the upper opening is fluidly coupled to the sink drain. To install the garbage disposal, the installer must hold the garbage disposal at an installation position at the bottom of the sink while placing the mounting ring. However, garbage disposals can be quite heavy and the access to the installation position can be limited, making the act of holding the garbage disposal during mounting ring placement challenging. Like garbage disposals, other items are also held at elevated positions for various reasons.

SUMMARY

In one aspect, a garbage disposal installation tool for supporting a garbage disposal beneath a drain opening of a sink at an installation position comprises a hook configured to be selectively engaged with the garbage disposal such that the garbage disposal can hang from the hook when the hook is engaged with the garbage disposal. An elongate suspender comprises a top end portion, a bottom end portion, and a suspender length extending from the top end portion to the bottom end portion. The bottom end portion of the suspender is connected to the hook. The suspender includes a connector configured to connect the suspender to the sink and an elastic segment located along the suspender length between the bottom end portion and the connector. The elastic segment is configured to resiliently extend along the suspender length when a tension is imparted on the elastic segment. The elastic segment is configured to impart a biasing force that urges the bottom end portion of the suspender toward the connector when the elastic segment is extended. The suspender is configured so that, when the connector is connected to the sink and the hook engages the garbage disposal at the installation position, the elastic segment is extended and the biasing force urges the garbage disposal toward a bottom portion of the sink.

In another aspect, a garbage disposal installation tool for supporting a garbage disposal beneath a drain opening of a sink at an installation position comprises a hook configured to be selectively engaged with the garbage disposal such that the garbage disposal can hang from the hook when the hook is engaged with the garbage disposal. An elongate suspender comprises a flexible suspension line having a top end portion, a bottom end portion, and a suspender length extending from the top end portion to the bottom end portion. The bottom end portion of the suspender is connected to the hook. The suspender further comprises a plurality of connectors at spaced apart locations along the suspender length. Each of the connectors is configured to be selectively connected to the sink at a common connection point to suspend the hook from the sink. When each connector is connected to the sink at the common connection point, the respective connector connects the suspender to the sink so that the hook is suspended and spaced apart from the common connection point by a respective suspension distance. Wherein the respective suspension distance of each of the plurality of connectors is different.

In still another aspect, a garbage disposal installation tool for supporting a garbage disposal beneath a drain opening of a sink at an installation position comprises a hook configured to be selectively engaged with the garbage disposal such that the garbage disposal can hang from the hook when the hook is engaged with the garbage disposal. An elongate suspender comprises a top end portion, a bottom end portion, and a suspender length extending from the top end portion to the bottom end portion. The bottom end portion of the suspender is connected to the hook. An elongate brace has a top, a first end portion, a second end portion, and a length extending from the first end portion to the second end portion. The brace is configured to be supported on the sink across the drain opening such that the first end portion and the second end portion engage the sink on opposite sides of the drain opening. The brace has a first elongate side, a second elongate side, and a width extending from the first side to the second side. Each of the first and second sides extends from adjacent the first end portion toward the second end portion of the brace. The brace defines a locking slot that intersects the first side at a location spaced apart between the first end portion and the second end portion of the elongate brace. The slot is sized and arranged to receive a portion of the suspender therein such that the suspender is positioned so that the locking formation engages the top of the brace to support the suspender on the brace.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
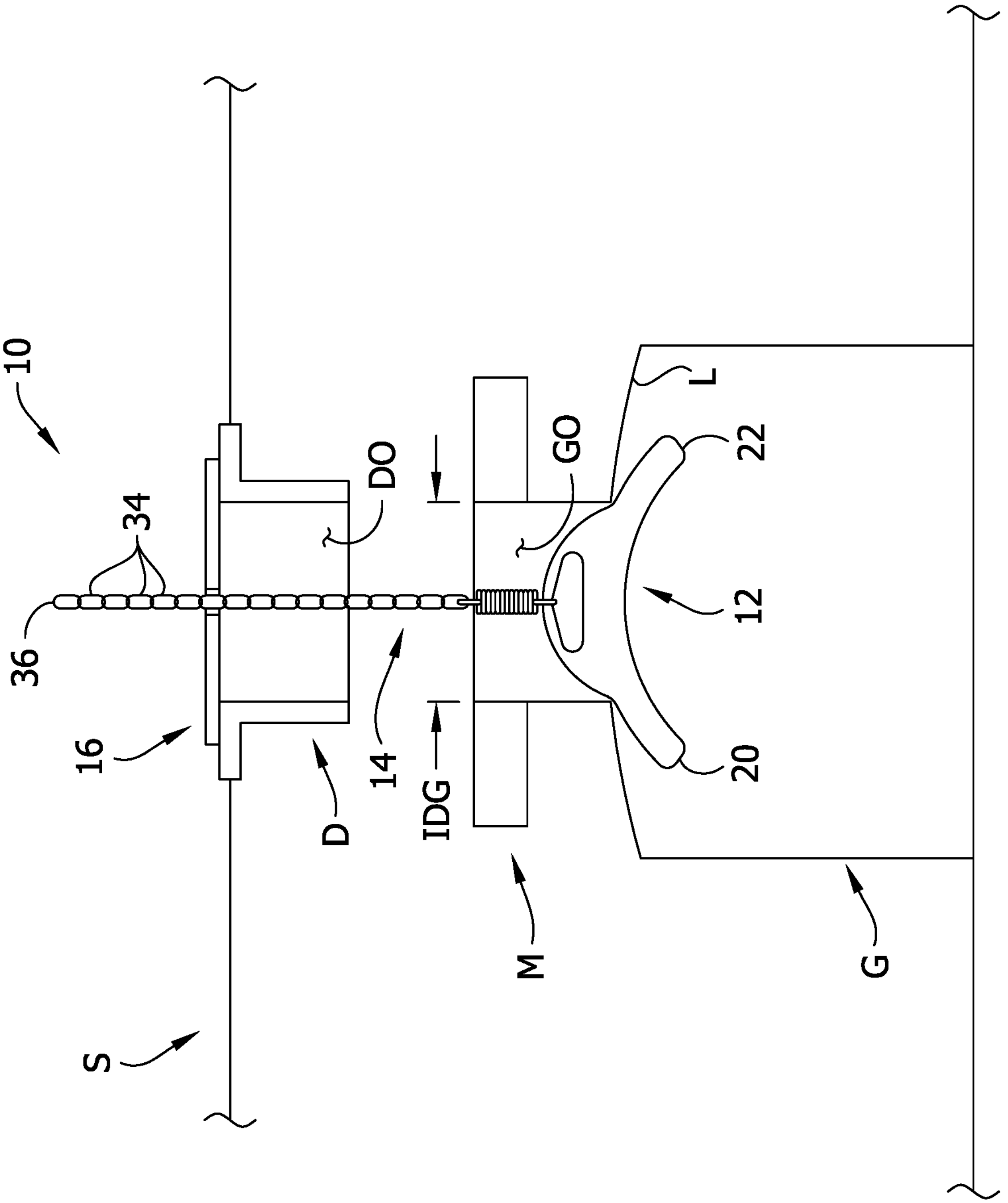
FIG. 1 is an elevation of the garbage disposal installation tool positioned in a garbage disposal prior to installation.

Referring to FIG. 1, one embodiment of a garbage disposal installation tool is generally indicated at reference number 10. In general, the installation tool 10 is configured for lifting and holding a garbage disposal G in place at an installation position (FIG. 2) in which the garbage disposal is located at an elevated position that is spaced apart above a support surface and arranged in proper registration with a drain D of a sink S for being coupled to the sink. Although the illustrated tool 10 is configured for lifting and holding a garbage disposal, it will be appreciated that, in other configurations, the tool can be configured for lifting and holding other articles at elevated positions. Thus, the illustrated tool 10 is one embodiment of what can broadly be referred to as an article suspension tool. As will be explained in further detail below, the illustrated garbage disposal installation tool 10 allows the garbage disposal G to be lifted to the installation position from an access point above the sink, thereby minimizing the work performed from an uncomfortable below-the-sink position. Moreover, since the installation tool 10 holds the garbage disposal G in place at the installation position, a user can freely manipulate a mounting ring M to couple the garbage disposal to the sink S without simultaneously supporting the weight of the garbage disposal.

In general, the garbage disposal installation tool comprises a hook, generally indicated at 12; a suspender, generally indicated at 14; and a brace generally indicated at 16. As explained in further detail below, the hook 12 is configured to internally engage the garbage disposal G such that the garbage disposal can hang from the hook. The suspender 14 is generally configured to extend upward from the hook through a top opening GO in the garbage disposal G and further through a drain opening DO in the sink S. An installer can lift the garbage disposal G to the installation position using the suspender 14 and the hook 12 while gripping the free end of the suspender at a location above the sink S. As explained more fully below, the brace 16 is configured to be supported on the sink S and to lockingly engage a portion of the suspender 14 to establish a connection between the sink and the suspender. When the hook 12 supports the garbage disposal G at the installation position and the brace 16 connects the suspender 14 to the sink S, the installation tool 10 holds the garbage disposal at the installation position so that a user can freely place the mounting ring M to couple the garbage disposal to the sink. Additional details of the illustrated hook 12, suspender 14, and brace 14 will now be described.

Figure 3:
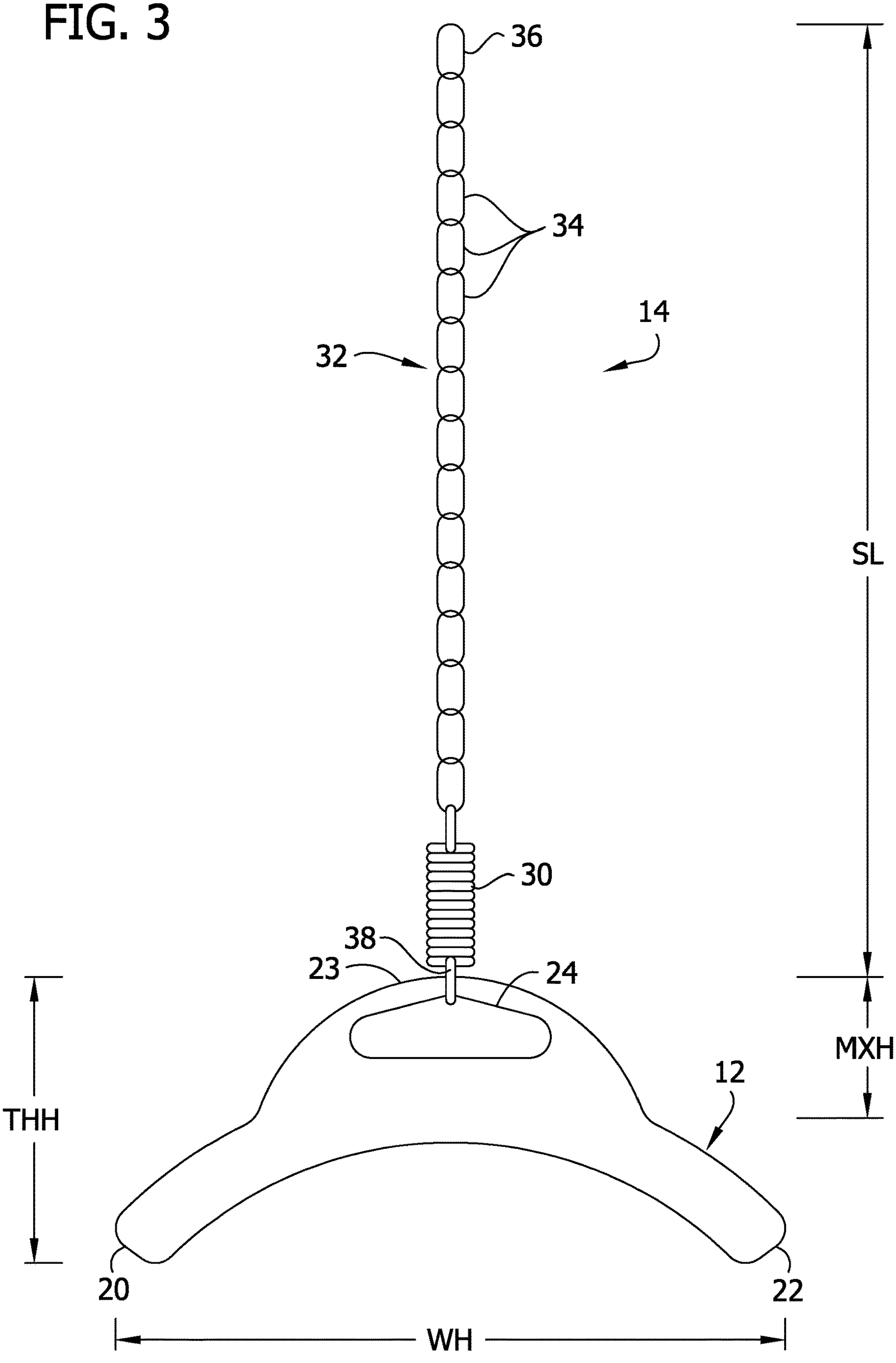
FIG. 3 is an elevation of a portion of the garbage disposal installation tool including a suspender and a hook.

Referring to FIG. 3, in one or more embodiments, the hook 12 has a generally arcuate shape that is sized and arranged for (i) inserting the hook into the garbage disposal G through the opening GO and (ii) engaging a lip L (broadly, a portion) of the garbage disposal to hang the garbage disposal from the hook. In the illustrated embodiment, the hook 12 comprises a strip of rigid or semi-rigid material (e.g., metal, wood, plastic, etc.) having an arcuate shape. The hook 12 has a first end portion 20 and a second end portion 22 that are spaced apart along a width WH of the hook. The illustrated hook 12 has an arcuate bottom edge margin that curves upwardly as it extends inward along the width WH from the first and second end portions 20, 22 to about a midpoint along the hook width WH. The hook 12 also has a top edge margin that has an upwardly curved arcuate shape that generally corresponds with the upwardly curved arcuate shape of the top edge margin. The top edge margin includes a protruding supplemental arch having a first end and a second end that are inwardly spaced from the first and second ends portions 20, 22 of the hook 12. The supplemental arch protrudes upwardly in a non-uniform manner with respect to the first and second end segments of the top edge margin along the first and second end portions 20, 22, respectively. The supplemental arch has an arcuate top edge that curves upwardly as it extends inward along the width WH from the end points to an apex portion 23 of the hook. The apex portion 23 is located at about a midpoint along the hook width WH. The supplemental arch has a radius of curvature that is less than the radii of curvature of the end portions of the hook 12. The hook 12 can have other configurations without departing from the scope of the invention.

In the preferred embodiment, the hook 12 is self-centering with respect to the suspender 14. A bottom end portion 38 of the suspender 14 is connected to the hook 12 at a connection point opening 24 (broadly, a connection point). In the illustrated embodiment, the connection point opening 24 is located generally at the apex portion 23, within the supplemental arch of the hook (e.g., at about the midpoint along the width WH of the hook 12). The bottom end portion 38 of the suspender 14 comprises a connection loop that is looped through the connection point opening 24 of the hook 12. The connection loop 38 is sized and arranged to loosely float on the top edge margin of the hook 12. Thus, the connection loop 38 can move along the width of the connection point opening 24. The connection point opening 24 has a top edge having a generally triangular shape. The top edge comprises first and second inclined segments that extend upward as they extend inward toward an apex of the connection point opening 24. The connection loop 38 tends to slide along the inclined top surfaces of the connection point opening 24 toward the apex of the connection point opening when the hook 12 is suspended from the suspender 14. The connection loop 38 thus tends to center itself within the apex of the connection point opening. In one or more embodiments, the hook 12 can comprise a receiver feature, such as a notch, for receiving the connection loop 38 at the apex of the connection point opening and providing some resistance to movement of the connection loop away from the apex.

Figure 5:
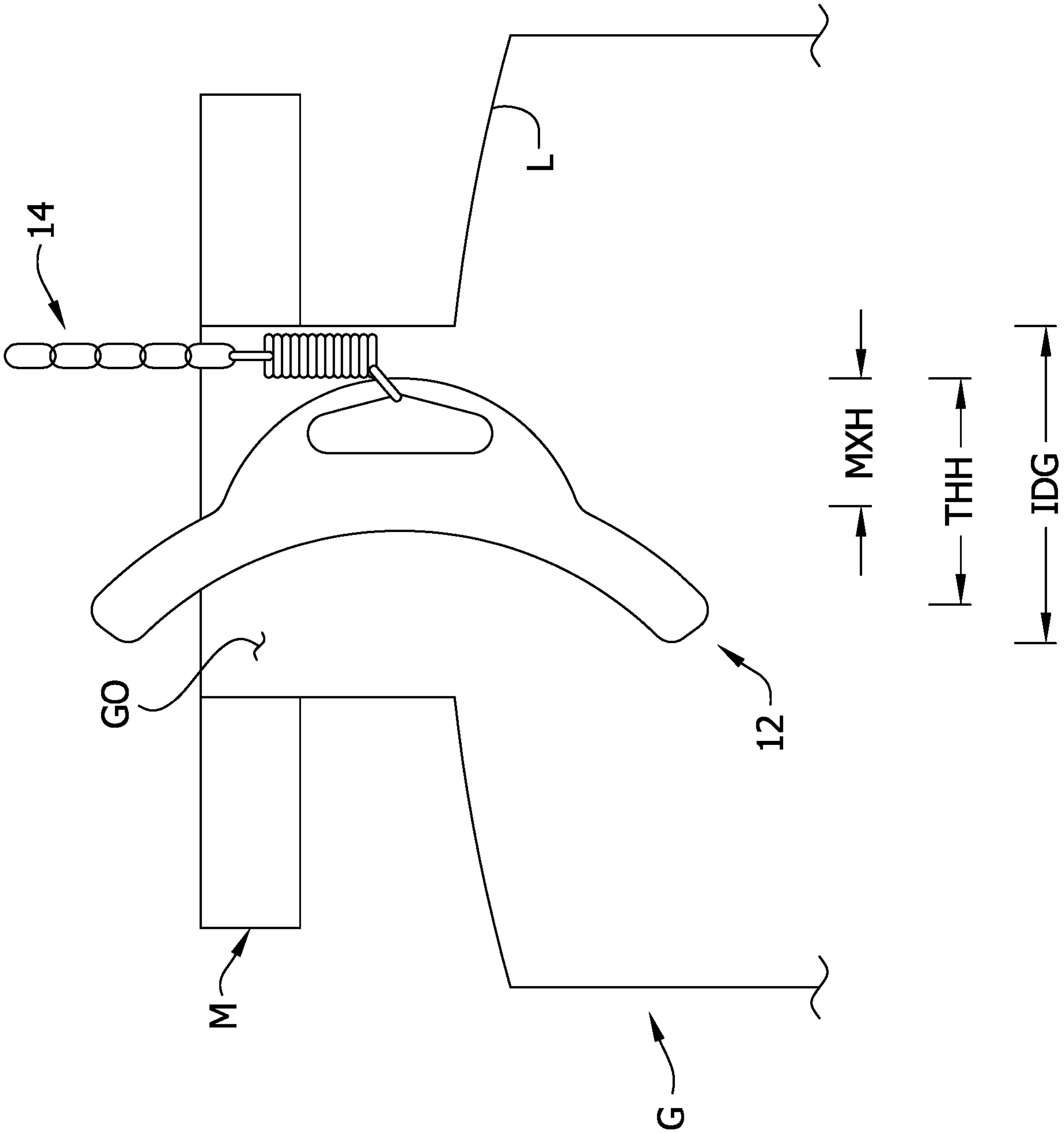
FIG. 5 is a front elevation of a portion of the garbage disposal installation tool as it is being inserted into a top opening of the garbage disposal.

Referring to FIG. 5, the illustrated hook 12 is configured to be inserted through the top opening GO of the garbage disposal G in an upright orientation. The hook 12 has a cross-sectional height extending vertically from the bottom edge margin to the top edge margin of the hook. Along the width WH, the illustrated hook 12 has a maximum cross-sectional height M×H at the apex portion 23. The apex portion 23 also defines a terminal top of the hook 12, while the first and second end portions 20, 22 define a terminal bottom of the hook. A total height THH of the hook 12 extends from the terminal bottom to the terminal top of the hook. In one or more embodiments, the total height THH and the maximum cross-sectional height M×H of the hook 12 are each less than an inner diameter IDG of the top opening GO of the garbage disposal G. Thus, the hook 12 can be inserted through the opening GO when it is oriented so that the width WH extends generally vertically. It is contemplated that, in other embodiments, the total height THH of the hook can be greater than the inner diameter IDG, as long as the maximum cross-sectional height M×H is less than the inner diameter to allow the hook to pass into the interior of the garbage disposal G through the opening GO. The hook can also have other configurations (e.g., be collapsible, etc.) that allow it to be inserted through the top opening of a garbage disposal in other embodiments.

Figure 2:
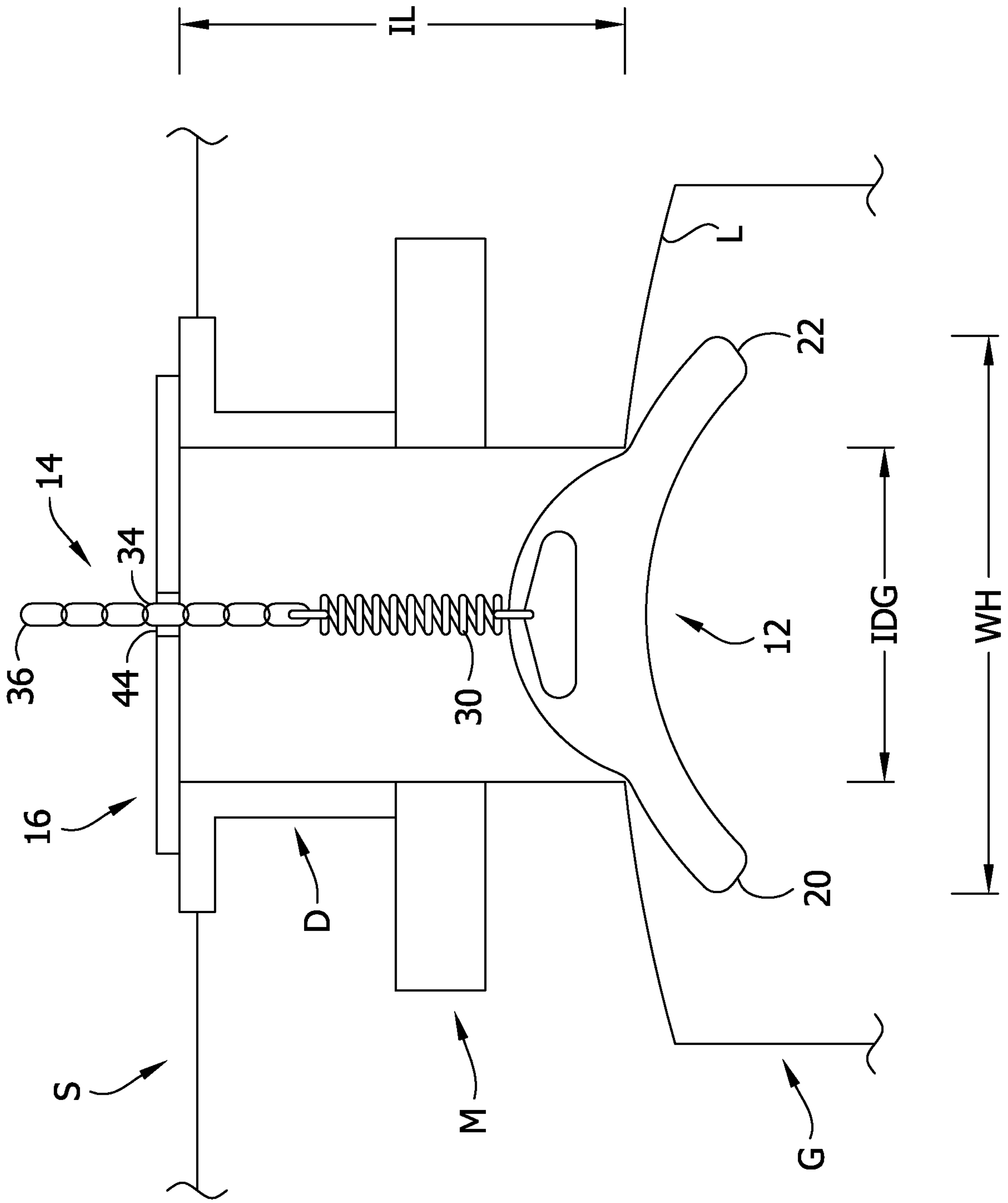
FIG. 2 is an elevation of the garbage disposal installation tool positioned in the garbage disposal in the installation position.

Referring to FIGS. 1 and 2, after being inserted into the garbage disposal G through the opening GO, the illustrated hook 12 is configured to engage the lip L of the garbage disposal G such that the garbage disposal can hang from the hook at a location spaced apart above an underlying support (e.g., the ground, a cabinet base, etc.). In the illustrated embodiment, the width WH of the hook 12 is greater than the inner diameter IDG of the lip L of the garbage disposal G. Thus, when the hook 12 is oriented in a horizontal orientation as shown in FIGS. 1 and 2, the first and second end portions 20, 22 of the hook can engage the lip L at diametrically spaced locations.

The hook 12 is self-centering with respect to the garbage disposal G. Since the top edge margin of the hook 12 slopes downwardly from the apex portion 23 in a symmetrical fashion toward each of the first and second end portions 20, 22, when a user lifts the suspender and imparts an upward force at the apex portion 23 of the hook, the lip L of the garbage disposal G slides along the top edge margin to automatically center itself along the hook width WH as the hook moves upward relative to the garbage disposal. As the hook 12 centers itself within the garbage disposal opening GO the supplemental arch protrudes further upward into the garbage disposal opening. In one or more embodiments, the supplemental arch provides tactile feedback to a user that a hook 12 has centered itself in the garbage disposal opening GO. When the supplement arch moves into registration with the garbage disposal opening GO, the lip L of the garbage disposal G slides relatively quickly along the steeply sloped sides of the supplemental arch and abruptly come to rest on the more gradually sloped end portions 20, 22 of the hook 12. The abrupt engagement with the shallow sloping end portions 20, 22 of the hook 12 may be perceptible to a user holding the suspender 14. In addition, the relatively steeply sloped sides of the supplemental arch tend to block lateral movement of the lip L of the garbage disposal along the width of the hook 12. As the hook 12 centers itself in the garbage disposal opening GO, the top edge margin of the hook 12 presses upward and radially outward against the lip L to securely engage and support the garbage disposal G.

Referring to FIG. 3, in one or more embodiments, the suspender 14 comprises a flexible suspension line (e.g., a chain, a strap, a cable, a rope, a cord, etc.) having a top end portion 36, a bottom end portion 38, and a suspender length SL extending from the top end portion to the bottom end portion. The bottom end portion 38 of the suspender 14 is connected to the hook 12 at a connection point 24 of the hook. In the illustrated embodiment, the connection point 24 is located generally at the apex portion 23 (e.g., at about the midpoint along the width WH of the hook 12). Suitably, the suspender length SL is configured so that, while the garbage disposal G is positioned on the support surface beneath the sink S (e.g., the floor, a cabinet base, etc.) and the hook 12 is received inside the garbage disposal G, the suspender 14 can extend through the drain opening DO of the sink such that installer can grip the top end portion 36 to lift the garbage disposal using the suspender and the hook. In other words, the suspender length SL can be greater than or equal to a height of the sink S in certain embodiments. Although the illustrated suspender 14 comprises a flexible suspension line, it will be understood that other suspenders can comprise rigid or semi-rigid materials such as elongate rods, etc.

In the illustrated embodiment, the suspender 14 comprises a chain. In one or more embodiments, the chain comprises a plurality of interconnected torus-shaped links 34. Adjacent links 34 have offset orientations such that a gap is defined along each chain link between end portions of the two adjacent chain links at each end of the respective chain link. As will be explained in further detail below, this gap facilitates using the chain links 34 as connectors or locking formations for connecting the suspender 14 to a common connection point defined by the brace 16. As is further explained below, when any of the chain links 34 is connected to the brace 16 while the brace is supported on the sink S, the suspender 14 is connected to the sink such that the suspender can suspend the full weight of the hook 12 and the garbage disposal G from the sink at a respective suspension distance from the common connection point defined by the brace. Accordingly, in one or more embodiments, the suspender 14 comprises a plurality of connectors or locking formations 34 (e.g., chain links) that are spaced apart along the length SL of the suspender. Other embodiments can have one or more connectors of other configurations without departing from the scope of the invention. Using the connectors 34 and the brace 16, the suspender 14 can be selectively connected to the sink S at a plurality of locations along the suspender length SL.

Referring to FIG. 2, depending on the type of garbage disposal G and/or sink S involved in an installation, an installation length IL (FIG. 2) extending between the bottom portion of the sink (e.g., the vertical location of the hook 12 when the hook supports the garbage disposal at the installation position) and the point of connection between the sink and the suspender (e.g., the vertical location of the brace 16) can vary. Because the chain links 34 form connectors/locking formations at spaced apart locations along the length SL of the suspender 14, the suspender can be selectively connected to the sink at the appropriate location to suit various installation lengths IL. Though the illustrated suspender includes a plurality of connectors 34 spaced apart along the suspender length SL, it will be understood that other suspenders can include only a single connector for connecting the suspender to a sink at a single location along the suspender length.

In the illustrated embodiment, the suspender 14 comprises a spring 30 (broadly, an elastic segment). The illustrated spring 30 comprises a coiled tension spring. However, other types of elastic segments (e.g., elastic cords, bungees, non-coiled springs, etc.) can be used without departing from the scope of the invention. The spring 30 is located adjacent the bottom end portion 38 of the suspender 14 such that, when the installation tool 10 holds the garbage disposal G in the installation position, the spring is positioned between the hook 12 and the point of connection between the suspender and the sink S. In general, the spring 30 is configured to resiliently extend along the suspender length SL when a tension is imparted on the spring. Furthermore, the spring 30 is configured to impart a biasing force that urges the bottom end portion 38 of the suspender upward toward the chain links 34 (connectors) when the spring is extended.

In one or more embodiments, the installation tool 10 is configured such that the biasing force of the spring 30 can urge the garbage disposal G toward engagement with the drain D or bottom portion of the sink S when the hook 12 supports the garbage disposal at the installation position and the suspender 14 is connected to the sink. For example, in one or more embodiments, the chain link 34 that is selected to be connected to the brace 16 is a chain link that, in a resting configuration of the spring 30 in which the spring is not extended, is spaced apart from the hook 12 by a distance along the suspender length SL that is less than the installation length IL (FIG. 2). When this chain link 34 is connected to the sink S using the brace 16, the spring 30 is extended and thus imparts a biasing force on the hook 12 and the garbage disposal G. The biasing force urges the garbage disposal G toward engagement with the drain D or bottom portion of the sink S and helps to maintain the garbage disposal at the installation position. Another advantage of using an extendable elastic segment 30 between the connectors 34 and the hook 12 is that extension of the elastic segment can compensate for slight differences in the true installation length IL and the resting length of a segment extending from the hook to a connector.

Figure 4:
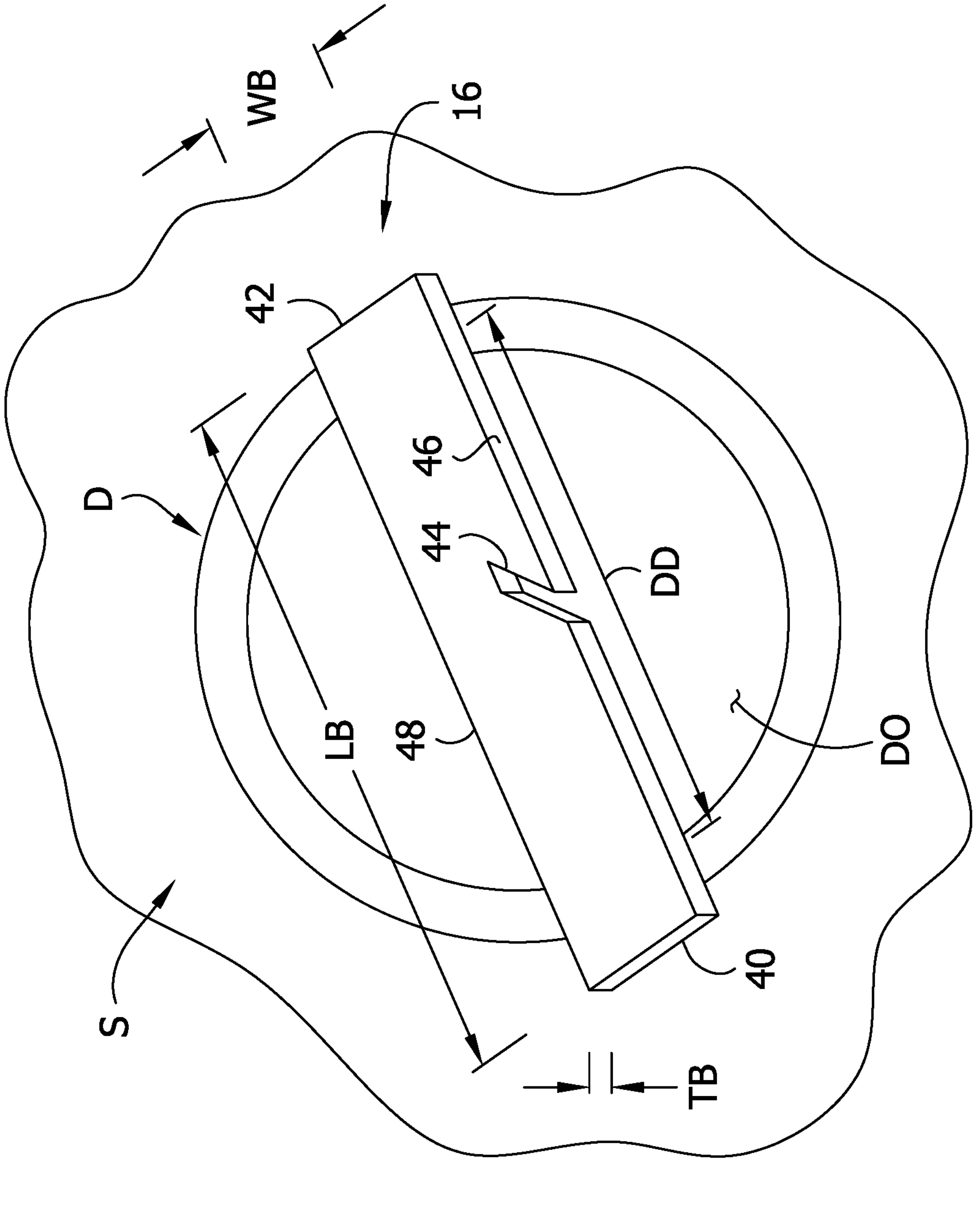
FIG. 4 is a perspective of a brace of the garbage disposal installation tool positioned on a sink.

Referring to FIG. 4, the illustrated brace 16 comprises a relatively thin, elongate rectangular bar of rigid or semi-rigid material (e.g., metal, plastic, wood, etc.). Other braces can have other shapes without departing from the scope of the invention. The brace 15 has first and second end portions 40, 42 and a length LB extending from the first end portion to the second end portion. The brace 16 also has a first elongate side 46, a second elongate side 48, and a width WB extending from the first side to the second side. Each of the first and second sides 46, 48 extends from adjacent the first end portion 40 toward the second end portion 42 of the brace 16. The illustrated brace 16 further includes a substantially flat top, a substantially flat bottom, and a thickness TB extending from the top to the bottom. The brace 16 is generally sized and arranged for being supported on the sink S over the drain opening DO. For example, in the illustrated embodiment, the length LB of the brace 16 is greater than a diameter DD of the drain opening DO. Thus, the brace 16 can extend across the drain opening with the first and second end portions 40, 42 supported on the sink S on opposite sides of the drain opening. It will be appreciated that the brace can be supported on the sink in other ways in other embodiments.

The illustrated brace 16 includes a locking slot 44 that extends through the thickness TB of the brace. As explained below, the slot 44 is sized and arranged to receive a portion of the suspender 14 therein such that the locking formations—provided in this embodiment by the chain links 34—can lockingly engage at least the top of the brace and/or portions of the brace defining the slot. The brace 16 is therefore configured to prevent each of the locking formations 34 from passing through the slot when the locking formations is connected to the brace. The engagement between the chain links 34 and the brace 16 connects the suspender 14 to the brace and such that the suspender, the hook 12, and the garbage disposal G can be supported by the brace.

In the illustrated embodiment, the locking slot 44 intersects the first side 46 at a location spaced apart between the first end portion 40 and the second end portion 42 of the brace 16. The locking slot 44 thus has an open end along the first side 46 of the brace 16 between the first and second end portions 40, 42 of the brace. In the illustrated embodiment, the slot 44 intersects the first side 46 at an open end located at about a midpoint along the length LB of the brace 16. The slot 44 extends from the first side 46 along the width WB of the brace 16 toward the second side 48 for the brace 16. More specifically, the slot 44 extends from the first side 46 toward the second side 48 at an oblique angle relative to the first side and the length LB of the brace 16. The slot 44 can also have other configurations (e.g., curved, perpendicular, etc.) without departing from the scope of the invention.

The illustrated slot 44 is arranged so that the suspender 14 (e.g., a chain link 34) can be inserted into the slot to establish a connection between the suspender and the brace 16. When one of the chain links 34 is inserted into the slot 44 and the suspender 14 is released, the above, adjacent chain link will engage the top of the brace 16, thereby connecting the suspender to the brace 16. Moreover, the illustrated brace 16 can be used to connect the suspender 14 to the sink S while the brace is resting on the sink above the drain opening DO. That is, an installer can position the brace 16 on the sink S over the drain opening DO, lift the garbage disposal G to the installation position using the suspender 14 and the hook 12, and then use the brace to establish a connection between the suspender and the sink S without moving the brace or separating the brace from the sink in any way. Although the illustrated brace 16 uses a slot 44 that intersects an elongate side 46 at a midpoint along the brace length LB to establish a connection between the brace and the suspender 14, other embodiments can have other connection structures or connection mechanisms (broadly, other connection configurations) without departing from the scope of the invention.

Referring to FIGS. 1 and 2, a method of installing a garbage disposal using the installation tool 10 will now be briefly described. An installer positions the garbage disposal G on a support surface beneath the sink and positions the brace 16 on the sink S across the drain opening DO such that the locking slot 44 generally overlies the drain opening. The installer inserts the hook 12 into the top opening of the garbage disposal by orienting the hook in the upright configuration shown in FIG. 5. After the hook 12 is received in the interior of the garbage disposal G, the installer rotates the hook to the horizontal orientation and pulls the suspender 14 upward to center the hook in the opening DO and engage the end portions 20, 22 of the hook with the lip L (as shown in FIG. 1). The installer then routes the top end portion 36 of the suspender 14 through the drain opening DO in the sink S. With the top end portion 36 positioned above the sink, the installer lifts the garbage disposal G to the installation position using the suspender 14 and the hook 12 while gripping the suspender from an access location above the sink. After the top of the garbage disposal G engages the bottom portion of the sink S, the installer imparts additional upward force upon the suspender 14 to extend the spring 30. With the spring 30 extended, the installer inserts a first one of the chain links 34 into the locking slot 44 of the brace 16 without moving the brace from its position on the sink S above the drain opening DO. The installer then releases the suspender 14. A second one of the chain links 34 located immediately above the first chain link engages the top of the brace 16 after the suspender 14 is released. The first and second chain links 34 thereby lockingly engage the brace 16 to connect the suspender 14 to the brace. Once the suspender 14 is connected to the brace 16, the suspender holds the garbage disposal in the installation position and the biasing force of the spring 30 helps maintain the garbage disposal at the installation position. With the garbage disposal G held in place at the installation position, the installer can work beneath the sink S (without manually supporting the garbage disposal) to connect the mounting ring M and thereby couple the garbage disposal to the sink.

Figure 6:
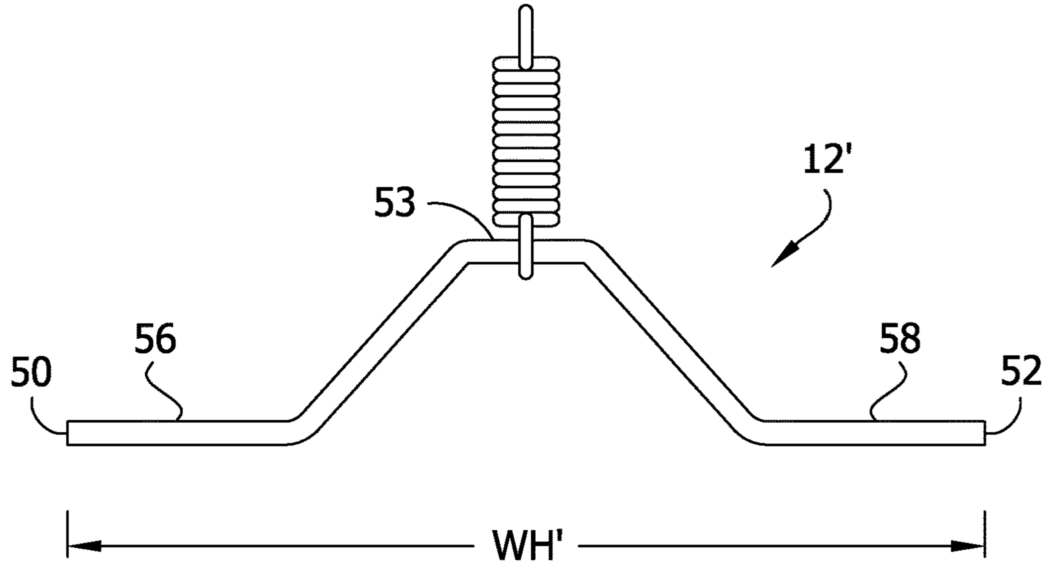
FIG. 6 is an elevation of another embodiment of a hook for a garbage disposal installation tool.

It will be appreciated that various configurations of a hook, a suspender, and a brace can be used without departing from the scope of the invention. For example, referring to FIG. 6, another embodiment of a hook that is suitable for use with garbage disposal installation tools in the scope of the present invention is generally indicated at 12'. Like the hook 12, the hook 12' is sized and arranged for (i) inserting the hook into the garbage disposal G through the opening GO and (ii) engaging a lip L of the garbage disposal to hang the garbage disposal from the hook. The hook 12' has a first end portion 50 and a second end portion 52 that are spaced apart along a width WH' of the hook. Like the hook 12, the hook 12' has a top and a bottom that both curve upwardly as they extend inward along the width WH' from adjacent the first and second end portions 50, 52 to an apex portion 53 located at about at about a midpoint along the width WH'. Unlike the hook 12, the top and bottom of the hook 12' are substantially straight along segments 56, 58 adjacent the end portions 50, 52. The hook 12' only has an arcuate shape along a middle segment of the width WH'. The hook 12' is configured so that when the hook is engaged with the garbage disposal lip L, the first and second straight segments 56, 58 extend generally horizontally.

Figure 7:
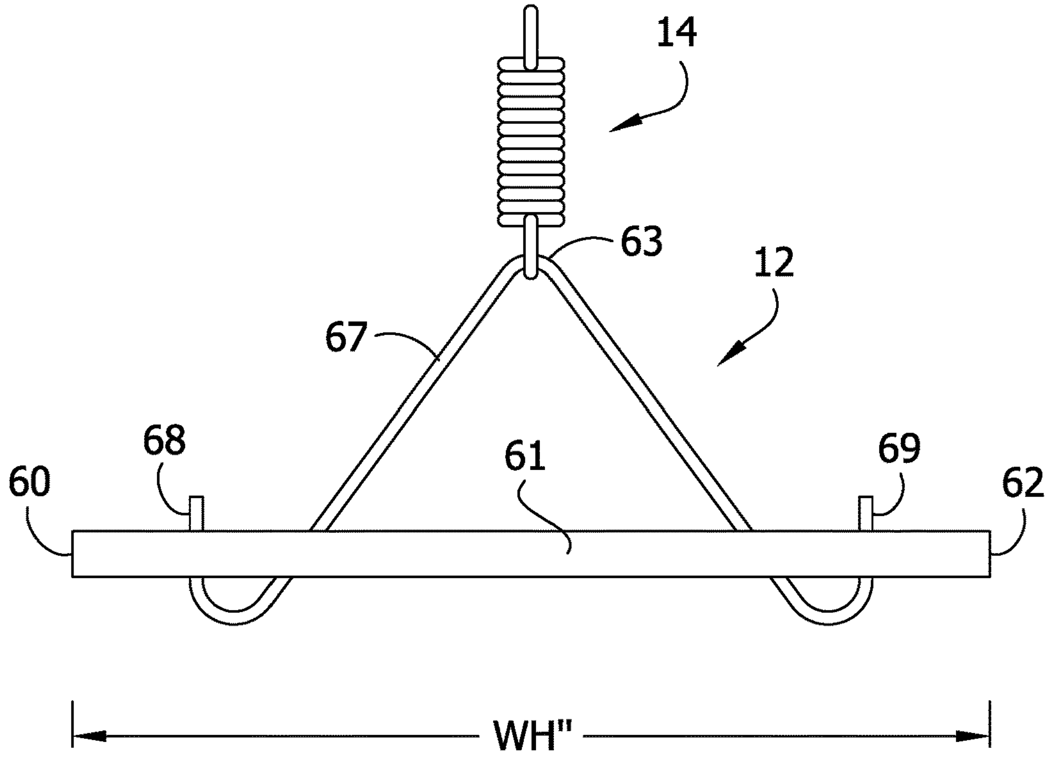
FIG. 7 is an elevation of another embodiment of a hook for a garbage disposal installation tool.

Referring to FIG. 7, another embodiment of a hook is generally indicated at reference number 12". Like the hooks 12, 12' described above, the hook 12" is sized and arranged for (i) inserting the hook into the garbage disposal G through the opening GO and (ii) engaging a lip L of the garbage disposal to hang the garbage disposal from the hook. The hook 12" comprises a plate 61 comprising a flat strip of rigid or semi-rigid material (e.g., metal, wood, plastic, etc.). The plate 61 has a first end portion 60 and a second end portion 62 that are spaced apart along a width WH" of the hook plate. The width WH" is configured so that the first and second end portions 60, 62 can engage the garbage disposal lip L to support the garbage disposal G. The hook 12" also comprises a yoke 67 that connects the plate 61 to the suspender. In the illustrated embodiment, the yoke 67 comprises a single length of wire, but the yoke can have other configurations in other embodiments. The yoke 67 has a first end portion 68 that is connected to the plate 61 adjacent the first end portion 60 of the plate and a second end portion 69 that is connected to the plate adjacent the second end portion of the plate. From the first and second end portions 68, 69, respectively, the first and second segments of the yoke 67 extend upward and inward along the width WH" to an apex 63 where the yoke is connected to the suspender 14. The apex portion 63 is located at about at about a midpoint along the hook 12" width WH".

Figure 8:
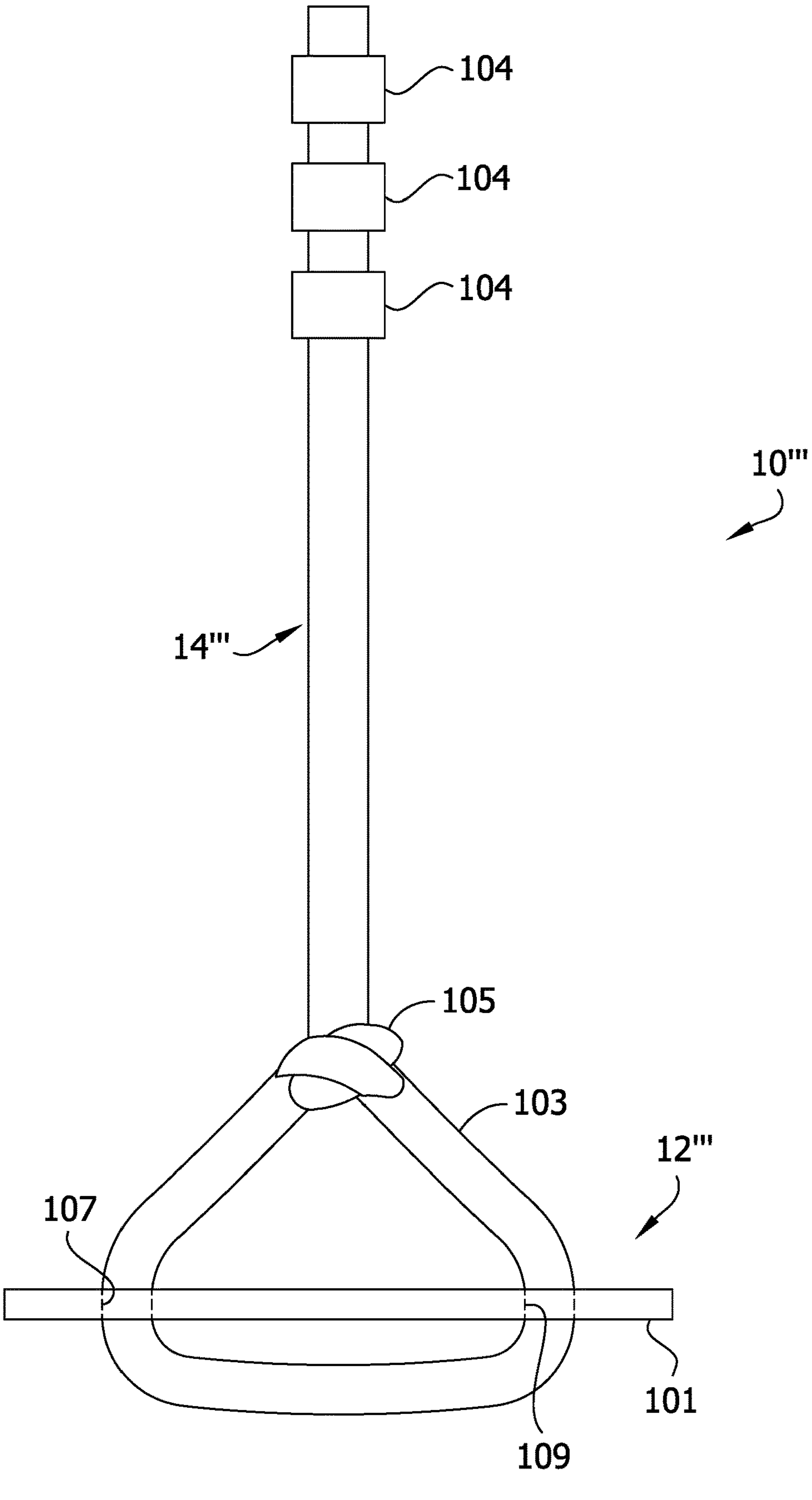
FIG. 8 is an elevation of another embodiment of a suspender and a hook of a garbage disposal installation tool.

Referring to FIG. 8, in another embodiment, the garbage disposal installation tool 10" comprises a suspender 14" formed from an elastic cord and a hook 12'" comprising a plate 101 that is connected to the suspender by a yoke portion 103 of the elastic cord. In the illustrated embodiment, the entire length of the suspender 14" is formed from elastic cord such that the suspender is resiliently stretchable along its entire length. Thus, a bottom portion of the suspender 14" formed by the elastic cord can function in the manner of the spring 30 of the garbage disposal installation tool 10 described above. One or more elements 104 that are configured to connect the suspender to a sink (e.g., using the brace 16) can be secured to the top end portion of the elastic cord. For example, in the illustrated embodiment, a plurality of swages 104 are fixed to the top end portion of the elastic cord at spaced apart locations along the length thereof. As will be appreciated, respective segments of the elastic cord located beneath each of the swages can be inserted into the slot 44 of the brace 16 during installation and the swages will come to rest on the top of the brace, thereby securing the suspender 14" to the sink S on which the brace is supported. In other embodiments, locking elements or connectors of other configurations can be used to secure an elastic cord to a sink at one or more locations along the length of the elastic cord.

Like the hook plate 61 described above, the hook plate 101 is sized and arranged for being inserted through the top opening GO in the garbage disposal G and, after being inserted, for engaging the lip L of the garbage disposal to hang the garbage disposal from the hook 12'". The hook plate 101 is connected to the suspender 14" by the yoke portion 103 of the elastic cord. The yoke portion 103 includes a segment of elastic cord that extends from a connection point 105 (which is located at the bottom end of the suspender 14" and an apex of the yoke portion) downward through a first opening 107 formed in the plate 101 adjacent a first end portion thereof. From the first opening 107, the yoke portion 103 extends along the bottom of the plate 101 and then upward through a second opening 109. From the second opening 109, the yoke portion 103 extends upward to the connection point 105 where the elastic cord is connected to itself (e.g., by a knot).

It will be appreciated that the principles of the garbage disposal installation tools described above can be adapted for use with tools for lifting and suspending other articles. In general such tools may include a hook for engaging and supporting the article and a suspender for connecting the hook to an overhead connection point. Other aspects of the garbage disposal installation tools described above, such as an elastic segment, spaced apart connectors/locking elements, and/or a slotted brace, may also be included in one or more embodiments of these tools.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A garbage disposal installation tool for supporting a garbage disposal beneath a drain opening of a sink at an installation position, the garbage disposal installation tool comprising:

a hook configured to be selectively engaged with the garbage disposal such that the garbage disposal can hang from the hook when the hook is engaged with the garbage disposal; and an elongate suspender comprising a top end portion, a bottom end portion, and a suspender length extending from the top end portion to the bottom end portion, the bottom end portion of the suspender being connected to the hook, the suspender including a connector configured to connect the suspender to the sink and an elastic segment located along the suspender length between the bottom end portion and the connector, the elastic segment being configured to resiliently extend along the suspender length when a tension is imparted on the elastic segment, the elastic segment being configured to impart a biasing force that urges the bottom end portion of the suspender toward the connector when the elastic segment is extended;

wherein the suspender is configured so that, when the connector is connected to the sink and the hook engages the garbage disposal at the installation position, the elastic segment is extended and the biasing force urges the garbage disposal toward a bottom portion of the sink; and wherein the suspender comprises a plurality of connectors spaced apart along the suspender length.

2. A garbage disposal installation tool set forth in claim 1, wherein the elastic segment of the suspender comprises a spring.

3. A garbage disposal installation tool for supporting a garbage disposal beneath a drain opening of a sink at an installation position, the garbage disposal installation tool comprising:

a hook configured to be selectively engaged with the garbage disposal such that the garbage disposal can hang from the hook when the hook is engaged with the garbage disposal; and an elongate suspender comprising a top end portion, a bottom end portion, and a suspender length extending from the top end portion to the bottom end portion, the bottom end portion of the suspender being connected to the hook, the suspender including a connector configured to connect the suspender to the sink and an elastic segment located along the suspender length between the bottom end portion and the connector, the elastic segment being configured to resiliently extend along the suspender length when a tension is imparted on the elastic segment, the elastic segment being configured to impart a biasing force that urges the bottom end portion of the suspender toward the connector when the elastic segment is extended;

wherein the suspender is configured so that, when the connector is connected to the sink and the hook engages the garbage disposal at the installation position, the elastic segment is extended and the biasing force urges the garbage disposal toward a bottom portion of the sink; and wherein the elastic segment of the suspender comprises an elastic cord.

4. A garbage disposal installation tool as set forth in claim 1, wherein the connector is configured to be connected to the sink at a connection point and the connection point is spaced apart from the bottom portion of the sink by an installation length, a portion of the installation tool extending from the hook to the connector having a length that is less than the installation length when the elastic segment is in a resting configuration in which the elastic segment is not extended.

5. A garbage disposal installation tool as set forth in claim 4, wherein said portion of the installation tool has a length that is greater than the installation length when the elastic segment is fully extended.

6. A garbage disposal installation tool as set forth in claim 1, further comprising a sink brace configured to be supported on the sink, wherein the connector is configured to be selectively engaged with the sink brace when the sink brace is supported on the sink to connect the connector to sink.

7. A garbage disposal installation tool as set for in claim 1, wherein the hook has a first end portion, a second end portion, and a width extending from the first end portion to the second end portion that is greater than an inner diameter of a lip portion of the garbage disposal such that the first and second end portions of the hook can simultaneously engage a bottom side of the lip portion when the hook is received inside the garbage disposal, the bottom end portion of the suspender being connected to the hook at a location spaced apart along the width of the hook between the first and second end portions of the hook.

8. A garbage disposal installation tool for supporting a garbage disposal beneath a drain opening of a sink at an installation position, the garbage disposal installation tool comprising:

a hook configured to be selectively engaged with the garbage disposal such that the garbage disposal can hang from the hook when the hook is engaged with the garbage disposal; and an elongate suspender comprising a top end portion, a bottom end portion, and a suspender length extending from the top end portion to the bottom end portion, the bottom end portion of the suspender being connected to the hook, the suspender including a connector configured to connect the suspender to the sink;

wherein the hook has a first end portion, a second end portion, and a width extending from the first end portion to the second end portion that is greater than an inner diameter of a lip portion of the garbage disposal such that the first and second end portions of the hook can simultaneously engage a bottom side of the lip portion when the hook is received inside the garbage disposal, the bottom end portion of the suspender being connected to the hook at a location spaced apart along the width of the hook between the first and second end portions of the hook;

wherein the hook has a top edge margin, the top edge margin having first and second end segments along the first and second end portions of the hook and a middle supplemental arch between the first and second end segments, the supplemental arch protruding upwardly with respect to the first and second end segments in a non-uniform manner.

9. A garbage disposal installation tool as set forth in claim 8, wherein the supplemental arch defines a connection point opening having a top edge, the top edge comprising first and second inclined segments that extend upward as they extend inward toward an apex of the connection point opening.

10. A garbage disposal installation tool for supporting a garbage disposal beneath a drain opening of a sink at an installation position, the garbage disposal installation tool comprising:

a hook configured to be selectively engaged with the garbage disposal such that the garbage disposal can hang from the hook when the hook is engaged with the garbage disposal; and an elongate suspender comprising a flexible suspension line having a top end portion, a bottom end portion, and a suspender length extending from the top end portion to the bottom end portion, the bottom end portion of the suspender being connected to the hook, the suspender further comprising a plurality of connectors at spaced apart locations along the suspender length, each of the connectors being configured to be selectively connected to the sink at a common connection point to suspend the hook from the sink, wherein when each connector is connected to the sink at the common connection point, the respective connector connects the suspender to the sink so that the hook is suspended and spaced apart from the common connection point by a respective suspension distance, wherein the respective suspension distance of each of the plurality of connectors is different.

11. A garbage disposal installation tool set forth in claim 10, wherein the installation tool further comprises a sink brace configured to be supported on the sink, the sink brace defining the common connection point.

12. A garbage disposal installation tool set forth in claim 11, wherein the brace defines a slot that is sized and arranged for receiving a portion of the flexible suspension line therein.

13. A garbage disposal installation tool set forth in claim 12, wherein the brace is shaped and arranged to prevent each of the connectors from passing through the slot when the connector is connected to the brace.

14. A garbage disposal installation tool set forth in claim 10, wherein the flexible suspension line comprises a chain and each connector comprises a link of the chain.

15. A garbage disposal installation tool for supporting a garbage disposal beneath a drain opening of a sink at an installation position, the garbage installation tool comprising;

a hook configured to be selectively engaged with the garbage disposal such that the garbage disposal can hang from the hook when the hook is engaged with the garbage disposal;

an elongate suspender comprising a top end portion, a bottom end portion, and a suspender length extending from the top end portion to the bottom end portion, the bottom end portion of the suspender being connected to the hook; and an elongate brace having a top, a first end portion, a second end portion, and a length extending from the first end portion to the second end portion, the brace being configured to be supported on the sink across the drain opening such that the first end portion and the second end portion engage the sink on opposite sides of the drain opening, the brace having a first elongate side, a second elongate side, and a width extending from the first side to the second side, each of the first and second sides extending from adjacent the first end portion toward the second end portion of the brace, the brace defining a locking slot that intersects the first side at a location spaced apart between the first end portion and the second end portion of the elongate brace, the slot being sized and arranged to receive a portion of the suspender therein such that the suspender is positioned so that the locking formation engages the top of the brace to support the suspender on the brace.

16. A garbage disposal installation tool set forth in claim 15, wherein the slot extends from the first side toward the second side of the brace.

17. A garbage disposal installation tool set forth in claim 16, wherein the slot extends toward the second elongate side at an oblique angle to the first elongate side.

18. A garbage disposal installation tool set forth in claim 15, wherein the slot intersects the first side at about a midpoint between the first end portion and the second end portion.

19. A garbage disposal installation tool set forth in claim 15, wherein the slot is arranged so that the suspender can be inserted into the elongate slot while the brace is supported on the sink across the drain opening.

20. The garbage disposal installation tool of claim 1:

wherein the hook has a first end portion, a second end portion, and a width extending from the first end portion to the second end portion that is greater than an inner diameter of a lip portion of the garbage disposal such that the first and second end portions of the hook can simultaneously engage a bottom side of the lip portion when the hook is received inside the garbage disposal, the bottom end portion of the suspender being connected to the hook at a location spaced apart along the width of the hook between the first and second end portions of the hook; and wherein the hook has a top edge margin, the top edge margin having first and second end segments along the first and second end portions of the hook and a middle supplemental arch between the first and second end segments, the supplemental arch protruding upwardly with respect to the first and second end segments in a non-uniform manner.

21. The garbage disposal installation tool of claim 10:

wherein the hook has a first end portion, a second end portion, and a width extending from the first end portion to the second end portion that is greater than an inner diameter of a lip portion of the garbage disposal such that the first and second end portions of the hook can simultaneously engage a bottom side of the lip portion when the hook is received inside the garbage disposal, the bottom end portion of the suspender being connected to the hook at a location spaced apart along the width of the hook between the first and second end portions of the hook; and wherein the hook has a top edge margin, the top edge margin having first and second end segments along the first and second end portions of the hook and a middle supplemental arch between the first and second end segments, the supplemental arch protruding upwardly with respect to the first and second end segments in a non-uniform manner.

22. The garbage disposal installation tool of claim 1 further comprising an elongate brace having a top, a first end portion, a second end portion, and a length extending from the first end portion to the second end portion, the brace being configured to be supported on the sink across the drain opening such that the first end portion and the second end portion engage the sink on opposite sides of the drain opening, the brace having a first elongate side, a second elongate side, and a width extending from the first side to the second side, each of the first and second sides extending from adjacent the first end portion toward the second end portion of the brace, the brace defining a locking slot that intersects the first side at a location spaced apart between the first end portion and the second end portion of the elongate brace, the slot being sized and arranged to receive a portion of the suspender therein such that the suspender is positioned so that the locking formation engages the top of the brace to support the suspender on the brace.

23. The garbage disposal installation tool of claim 8 further comprising an elongate brace having a top, a first end portion, a second end portion, and a length extending from the first end portion to the second end portion, the brace being configured to be supported on the sink across the drain opening such that the first end portion and the second end portion engage the sink on opposite sides of the drain opening, the brace having a first elongate side, a second elongate side, and a width extending from the first side to the second side, each of the first and second sides extending from adjacent the first end portion toward the second end portion of the brace, the brace defining a locking slot that intersects the first side at a location spaced apart between the first end portion and the second end portion of the elongate brace, the slot being sized and arranged to receive a portion of the suspender therein such that the suspender is positioned so that the locking formation engages the top of the brace to support the suspender on the brace.

24. The garbage disposal installation tool of claim 10 further comprising an elongate brace having a top, a first end portion, a second end portion, and a length extending from the first end portion to the second end portion, the brace being configured to be supported on the sink across the drain opening such that the first end portion and the second end portion engage the sink on opposite sides of the drain opening, the brace having a first elongate side, a second elongate side, and a width extending from the first side to the second side, each of the first and second sides extending from adjacent the first end portion toward the second end portion of the brace, the brace defining a locking slot that intersects the first side at a location spaced apart between the first end portion and the second end portion of the elongate brace, the slot being sized and arranged to receive a portion of the suspender therein such that the suspender is positioned so that the locking formation engages the top of the brace to support the suspender on the brace.

25. The garbage disposal installation tool of claim 21 further comprising an elongate brace having a top, a first end portion, a second end portion, and a length extending from the first end portion to the second end portion, the brace being configured to be supported on the sink across the drain opening such that the first end portion and the second end portion engage the sink on opposite sides of the drain opening, the brace having a first elongate side, a second elongate side, and a width extending from the first side to the second side, each of the first and second sides extending from adjacent the first end portion toward the second end portion of the brace, the brace defining a locking slot that intersects the first side at a location spaced apart between the first end portion and the second end portion of the elongate brace, the slot being sized and arranged to receive a portion of the suspender therein such that the suspender is positioned so that the locking formation engages the top of the brace to support the suspender on the brace.

* * * * *